US005492765A

United States Patent [19]
Vratsanos et al.

[11] Patent Number: 5,492,765
[45] Date of Patent: Feb. 20, 1996

[54] USE OF VINYLAMINE HOMOPOLYMERS AND COPOLYMERS IN FILM LAMINATION

[75] Inventors: Lori A. Vratsanos, Breinigsville, Pa.; Jeffrey A. Kuphal, Flemington, N.J.; Walter L. Renz, Macungie, Pa.

[73] Assignee: Air Products and Chemicals, Inc., Allentown, Pa.

[21] Appl. No.: 122,993

[22] Filed: Sep. 17, 1993

[51] Int. Cl.$^6$ .......................... B32B 15/08; B32B 23/08; B32B 27/10; B32B 27/30
[52] U.S. Cl. .......................... 428/461; 428/245; 428/246; 428/248; 428/260; 428/261; 428/262; 428/264; 428/463; 428/507; 428/510; 428/511; 428/514; 428/520; 428/537.1; 428/537.5
[58] Field of Search .......................... 428/461, 500, 428/514, 511, 245, 261, 520, 507, 508, 537.1, 537.5, 464, 246, 248, 260, 262, 264, 463, 510; 524/524, 459; 525/217, 218

[56] References Cited

U.S. PATENT DOCUMENTS

| | | | |
|---|---|---|---|
| 2,828,237 | 3/1958 | Rosser | 154/139 |
| 3,033,707 | 5/1962 | Lacy et al. | 117/76 |
| 3,096,602 | 7/1963 | Newmaker | 53/22 |
| 3,140,196 | 7/1964 | Lacy et al. | 117/75 |
| 3,230,135 | 1/1966 | Hurst | 161/250 |
| 3,361,586 | 1/1968 | Lindsey | 117/46 |
| 4,217,214 | 8/1980 | Dubin | 210/52 |
| 4,280,942 | 7/1981 | Green | 260/27 R |
| 4,308,189 | 12/1981 | Moritani et al. | 260/29.6 WA |
| 4,843,118 | 6/1989 | Lai et al. | 524/552 |
| 4,921,621 | 5/1990 | Costello et al. | 252/8.513 |
| 5,011,883 | 4/1991 | Aksman | 524/513 |
| 5,086,111 | 2/1992 | Pinschmidt, Jr. et al. | 525/61 |
| 5,194,492 | 3/1993 | Pinschmidt | 525/60 |
| 5,326,809 | 7/1994 | Bott et al. | 524/459 |

FOREIGN PATENT DOCUMENTS 4264182  9/1992  Japan .......................... C09J 129/04

*Primary Examiner*—D. S. Nakarani
*Attorney, Agent, or Firm*—Michael Leach; William F. Marsh

[57] ABSTRACT

A composite structure which comprises, in intimate jointed lamination, a substrate layer, and intermediate adhesion layer, and a tightly adhered polymeric film, the adhesion layer comprising an aqueous emulsion polymer containing a vinylamine homopolymer or copolymer, preferably polyvinyl alcohol/polyvinylamine copolymer.

21 Claims, No Drawings

USE OF VINYLAMINE HOMOPOLYMERS AND COPOLYMERS IN FILM LAMINATION

TECHNICAL FIELD

The present invention relates to laminate structures comprising a polymeric film that is bonded to a substrate layer.

BACKGROUND OF THE INVENTION

Polyvinyl acetate and acrylic-based emulsions are used extensively in adhesives in many applications, including furniture construction, vinyl laminating, pressure sensitive adhesives, consumer glues and food packaging. One major area of interest is film laminates. Such multilayer film constructions are used to package foods and consumer products and offer a combination of properties not obtainable with a single product. Often paper is used for mechanical strength and is bonded to a plastic film to give a packaging material which has improved water resistance.

Joining dissimilar films can be accomplished in several ways; one is by coextrusion of two or more thermoplastic materials. Laminating films as they exit the extruder gives a multilayer film which has good mechanical integrity, as long as the materials are not too dissimilar chemically. Films which have markedly different surface energies may not have sufficient adhesion to hold together. Often adhesive tie layers are used to improve layer to layer adhesion.

An alternate method of construction is the use of adhesives to laminate films together. Aqueous vinyl acetate-based and acrylic-based polymer emulsions are commonly used to bond porous substrates, such as paper, to plastic films including polyvinyl chloride, polyethylene terephthalate, polyethylene, polypropylene and the like. Such emulsions have the required properties of wet tack, adhesive strength and runnability to be used in high speed laminating lines.

Often the adhesive strength between the two films of interest is insufficient for the required end use. In such cases, it is common to use an adhesion promoter to improve the adhesive strength. One compound in current use as an adhesion promoter is polyethylenimine (PEI). Addition of PEI at 0.5 to 2% of the polymer weight in the emulsion commonly gives improved adhesion on low surface energy films. Such adhesion is commonly measured by the T-peel test.

Representative of art teaching the use of polyalkylenimine resins such as PEI resins in film laminates include the following:

U.S. Pat. Nos. 2,828,237; 3,033,707; 3,096,602; 3,140,196; 3,230,135 and 3,361,586.

JP4-264182 discloses a wood adhesive composition comprising a polyvinyl alcohol A, a filler B and a waterproofing agent C; each molecule of the polyvinyl alcohol containing at least one type of functional group selected from among primary amino groups, primary ammonium salt groups, secondary amino groups, and secondary amino salt groups. The adhesive composition may also contain an aqueous polymer emulsion D at 5 to 400 weight parts per 100 weight parts of polyvinyl alcohol A.

U.S. Pat. No. 5,326,809 discloses a method for preparing aqueous emulsions in the presence of a poly[(vinyl alcohol)-co-(vinylamine)] copolymer [PVOH/PVAm] as a protective colloid and aqueous polymer emulsions containing such copolymer. Polyvinyl acetate emulsions prepared using such copolymer as a stabilizing agent were tested as single lap shear adhesive joints employing maple wood adherends.

SUMMARY OF THE INVENTION

The present invention pertains to a composite structure which comprises, in intimate joined lamination, a substrate layer, an intermediate adhesive layer and a tightly adhered film, preferably a polymeric film. The present invention provides for use as the intermediate adhesion layer an adhesive composition consistently essentially of an aqueous adhesive emulsion polymer and 0.1 to 10 wt % vinylamine (VAm) polymer, based on emulsion polymer.

An aqueous adhesive polymer emulsion containing the VAm polymer is applied to the substrate and, upon drying of the applied aqueous adhesive polymer emulsion composition, the VAm polymer functions as an adhesion promoter in the aqueous adhesive emulsion polymer.

DETAILED DESCRIPTION OF THE INVENTION

Suitable vinylamine (VAm) polymers which can be used as adhesion promoters according to the present invention include homopolymers and copolymers of VAm. The homopolymers and copolymers can be derived through several methods including the polymerization of N-vinylformamide (NVF) with or without vinyl acetate (VAc) as a comonomer, followed by partial (<95 mole %) or full hydrolysis (≧95 mole %) of the amide functionality to form primary amines. The VAc functionality in the copolymer can be hydrolyzed partially (<98 mole %) or fully (≧98 mole %) to form copolymers of polyvinyl alcohol (PVOH) and polyvinylamine (PVAm), i.e. [PVOH/PVAm]. The VAm incorporation into the copolymer can range from 0.5 to 30 mole %, but most often is in the range of 0.5 to 20 mole %, preferably 5 to 12 mole %. Moreover, the amine functionality of the homopolymers and copolymers may be neutralized with acids including organic acids and inorganic acids such as hydrochloric acid to form the amine salt. However, the basic form, i.e., the free amine, is preferred as the adhesion promoter.

PVAm can be prepared by solution polymerization of vinylamides in water, a water-soluble solvent or a mixture of water and a water-soluble solvent. U.S. Pat. No. 4,421,602 which discloses linear basic polymer containing from 90 to 10 mole % copolymerized VAm units and 10 to 90 mole % copolymerized NVF units shows such solution polymerization. U.S. Pat. No. 4,952,656 teaches the inverse emulsion polymerization of NVF to make poly(N-vinylformamide) [PNVF] which is then hydrolyzed to PVAm. Depending upon the extent of the hydrolysis reaction on the formamide functionalities, the resulting PVAm may contain unhydrolyzed NVF units in the copolymer. Regardless of the degree of hydrolysis, the polymers will be identified as PVAm. Accordingly, the PVAm may be represented by the following general formula I:

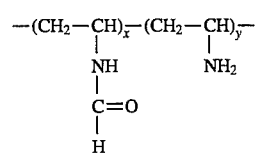

where x=0–75 mole %, preferably 0–30 mole %, and
y=25–100 mole %, preferably 70–100 mole %.

It is most preferred to use the fully hydrolyzed PVAm.

The weight-average molecular weight (Mw) of the PVAm's would range from 10,000 to 500,000, preferably 15,000 to 250,000. Lower molecular weight PVAm's of Mw=25,000 to 75,000 are most preferred.

The PVOH/PVAm used as the adhesion promoter is prepared by copolymerizing VAc and NVF and hydrolyzing the resulting PVAc/PNVF. U.S. Pat. No. 4,774,285 and EP 0,339,371 A2 teach the preparation of suitable PVOH/PVAm's for use in the present invention. See also U.S. Pat. No. 5,194,492. Depending upon the extent of the hydrolysis reaction on the acetate and formamide functionalities, the resulting PVOH/PVAm may contain unhydrolyzed VAc and/or NVF units in the copolymer. Regardless of the degree of hydrolysis, the polymers will be identified as PVOH/PVAm. Accordingly, the PVOH/PVAm may be represented by the following general formula II.

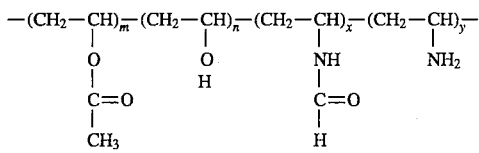

where
- m=0–15 mole %, preferably 0–2 mole %,
- n=50–99 mole %, preferably 70–95 mole %,
- x=0–30 mole %, preferably 0.5–10 mole %, and
- y=0.5–30 mole %, preferably 0.5–20 mole %.

In the most preferred copolymer
- m=0–2 mole %,
- n=85–95 mole %,
- x=0.5–4 mole %, and
- y=5–12 mole %.

Although the lower limit of "m" and "x" in the above formulae I and II is stated, for convenience, as 0, in all likelihood, the lower limit may be a fractional number slightly greater than 0 due to the physical "impossibility" of hydrolyzing every single acetate and formamide functionality in the polymers.

The PVOH/PVAm may also contain polymerized ethylene to provide polyvinyl alcohol/polyethylene/polyvinylamine terpolymers [PVOH/PE/PVAm]. The polyethylene content of the terpolymers may range from 5 to 30 mole %, preferably 10 to 20 mole %.

The weight-average molecular weight (Mw) of the PVOH/PVAm's would range from 10,000 to 200,000, preferably 30,000 to 50,000.

The polymer and copolymers of VAm and/or VAm salts can be used as 10 solids or dissolved in aqueous media for solutions then added to the aqueous adhesive compositions to improve adhesion of the film laminate structures.

Most often, such film laminate structures include one porous substrate such as paper or other cellulosic material which allows the water present in the adhesive composition to be removed through drying or absorbed into the porous substrate. Suitable substrates in addition to the cellulosic materials, include metals such as aluminum, cloths of synthetic and/or natural fibers, and polymeric materials. Films suitable for use in the film laminate structures include cellulosic materials such as paper, metal foils such as aluminum and polymeric materials. Polymeric materials useful as the substrate and the film include polyolefin films such as polyethylene and polypropylene, polyester films such as polyethylene terephthalate (PET), polyvinyl chloride and other polymeric materials well known in the film lamination art. Also specifically contemplated as film laminate structures are metal foil, such as aluminum, to paper substrate and paper to polymeric substrates. The films would have a thickness of 0.003 to 20 mils. Where the substrate comprises a structure other than a film, as for example sheeting, the thickness may range up to about 1000 mils.

As mentioned, one method for preparing the laminates comprises coating a porous substrate with the adhesive composition then laminating the film to the adhesive coated surface and drying the structure by removing water through the porous substrate. Other processing methods would include the dry film system in which the adhesive composition is applied to the substrate and then dried before lamination of the film. Obviously, in this case a porous substrate is not necessary.

The adhesive composition, whether as a solution or emulsion, is applied to the substrate by spraying, curtain coating or other similar methods. The adjoining film is then laminated by the use of heat and/or pressure to form a good adhesive bond with the coated substrate. The application of the adhesive composition and the lamination may be performed according to methods and using equipment well known in the art. Constructions of more than two layers are possible.

The aqueous adhesive polymer [homopolymers or copolymers] emulsions which may be used in the practice of this invention are those well known in the adhesive art and include vinyl acetate polymer emulsions commercially available as Vinac® and Airflex® polymer emulsions from Air Products and Chemicals, Inc., Resyn® and Duroset® polymer emulsions from National Starch and Chemical Company and Elvace® emulsions from Reichhold Chemical, Inc.; acrylic polymer emulsions commercially available as Flexbond®, Flexcryl® and Flexthane™ emulsions from Air Products and Chemicals, Inc. and others from Rohm and Haas Company; and vinyl/acrylic copolymer emulsions commercially available as Flexbond® emulsions from Air Products and Chemicals, Inc. The aqueous adhesive polymer emulsions typically contain 40 to 70 wt % polymer solids.

The preferred aqueous polymer adhesive composition is a vinyl acetate/ethylene (VAE) copolymer emulsion in which the copolymer contains 5 to 40 wt % ethylene, preferably 10 to 30 wt % ethylene and may also include up to 10 wt % of other copolymerizable monomers such as acrylic acid, maleic acid or anhydride, acrylamide and N-methylolacrylamide. Especially preferred are PVOH stabilized VAE copolymer emulsions such as AIRFLEX 400, 426 and 465 VAE copolymer emulsions.

As disclosed in U.S. Pat. No. 5,326,809, the PVOH/PVAm copolymers may be used as the stabilizing system for the preparation of the vinyl acetate and VAE copolymer emulsions or the PVAm and PVOH/PVAm copolymers can be post-added, i.e., blended, with appropriate aqueous polymer emulsions. In either case the aqueous polymer emulsion should contain 0.1 to 10 wt % of the VAm polymer, on a solids basis. It is preferred to use about 0.5 to 5 wt %, preferably about 2 wt % of the VAm polymers.

The amount of the aqueous adhesive applied to the substrate may range from 0.1 to about 3 mils wet.

In the following examples ASTM standard method D413 for T-peel testing was used. Adhesives were applied to the cloth substrates using a number 40 wire-wrapped rod, and the indicated film was applied using a seven pound (3.18 kg) weighted roller. Strips were cut 2 inches (5.08 cm) wide and the samples were conditioned for 24 hours at 75° F. (24° C.) and 50% relative humidity. Samples were pulled on an Instron universal testing machine, using a crosshead speed of 2 in/min (5.08 cm/min).

EXAMPLE 1

Various materials were tested at 2 wt % (solids) as adhesion promoter additives to Airflex 400 VAE copolymer emulsion (Tg=0° C.; 55% solids) in the lamination of cloth to untreated Mylar PET substrate (surface energy=55.3 dynes/cm). Airflex 400 emulsion is PVOH stabilized. Results are presented in Table 1.

TABLE 1

| Run | Adhesive Composition | Adhesive Strength, kg/m |
| --- | --- | --- |
| 1 | Airflex 400 control | 3.39 |
| 2 | Airflex 400 + 2% Airvol 325 control | 3.57 |
| 3 | Airflex 400 + 2% Polymin P | 10.18 |
| 4 | Airflex 400 + 2% PVOH/PVAm (94/6) | 5.18 |
| 5 | Airflex 400 + 2% PVOH/PVAmHCl (94/6) | 5.54 |
| 6 | Airflex 400 + 2% PVOH/PVAm (88/12) | 9.29 |
| 7 | Airflex 400 + 2% PVOH/PVAmHCl (88/12) | 4.82 |
| 8 | Airflex 400 + 2% PVOH/PVAm (80/20) | 11.79 |
| 9 | Airflex 400 + 2% PVAmHCl | 4.46 |
| 10 | Airflex 400 + 2% PVAm | 15.54 |

Airvol 325: PVOH (98.5 mole % hyd; DPn = 1750)
Polymin P: PEI from BASF (Mw = 70,000)
PVOH/PVAm (94/6): (94 mole % PVOH; 6 mole % PVAm; Mw = 85,000–145,000)
PVOH PVAm (88/12): (88 mole % PVOH; 12 mole % PVAm; Mw = 85,000–145,000)
PVAm: Mw = 226,000
kg/m: kilograms per linear meter Table 1 shows that PVOH/PVAm in acidic and basic forms improved the adhesive strength of Airflex 400 VAE emulsion. Run 10 shows that PVAm basic form provided a marked improvement in the adhesive strength well beyond the industry standard PEI.

EXAMPLE 2

PVAm and PVOH/PVAm were tested as an additive to Airflex 400 VAE copolymer emulsion in the lamination of cloth to corona treated oriented polypropylene (OPP) (surface energy=49.2 dynes/cm). See Table 2 for results.

TABLE 2

| Run | Adhesive Composition | Adhesive Strength, kg/m |
| --- | --- | --- |
| 11 | Airflex 400 control | 7.50 |
| 12 | Airflex 400 + 2% Airvol 325 control | 10.54 |
| 13 | Airflex 400 + 2% Polymin P | 31.97 |
| 14 | Airflex 400 + 2% PVOH/PVAm (94/6) | 8.93 |
| 15 | Airflex 400 + 2% PVOH/PVAmHCl (94/6) | 8.75 |
| 16 | Airflex 400 + 2% PVOH/PVAm (88/12) | 18.57 |
| 17 | Airflex 400 + 2% PVOH/PVAmHCl (88/12) | 13.21 |
| 18 | Airflex 400 + 2% PVOH/PVAm (80/20) | 20.72 |
| 19 | Airflex 400 + 2% PVAmHCl | 13.21 |
| 20 | Airflex 400 + 2% PVAm | >> strength of film |

Table 2 shows the PVOH/PVAm containing 6 mole % VAm afforded a slight improvement in adhesive strength of the VAE emulsion copolymer in acidic and basic forms whereas the copolymer containing 12 mole % VAm imparted much greater improvement. Noteworthy is the performance of PVAm in basic form in Run 20 in which the film tore before it could be pulled from the substrate.

EXAMPLE 3

Example 2 was repeated on aluminum foil which was cleaned in dilute NaOH and dried at 125° C. for 30 minutes. Results are shown in Table 3.

TABLE 3

| Run | Adhesive Composition | Adhesive Strength, kg/m |
| --- | --- | --- |
| 21 | Airflex 400 control | 49.29 |
| 22 | Airflex 400 + 2% Airvol 325 control | 54.11 |
| 23 | Airflex 400 + 2% Polymin P | 53.75 |
| 24 | Airflex 400 + 2% PVOH/PVAm (94/6) | 55.90 |
| 25 | Airflex 400 + 2% PVOH/PVAmHCl (94/6) | 53.22 |
| 26 | Airflex 400 + 2% PVOH/PVAm (88/12) | 78.40 |
| 27 | Airflex 400 + 2% PVOH/PVAmHCl (88/12) | 81.25 |
| 28 | Airflex 400 + 2% PVAmHCl | 49.65 |
| 29 | Airflex 400 + 2% PVAm | 60.36 |

Runs 26 and 27 show that PVOH/PVAm containing 12 mole % VAm in both acidic and basic forms greatly improved the adhesive strength of the VAE emulsion copolymer. Also noteworthy was the synergistic behavior of these 12 mole % VAm copolymers in comparison to the results obtained for the constituent homopolymers in Runs 22, 28 and 29.

EXAMPLE 4

Other VAE copolymer emulsions were tested on aluminum foil, including Airflex 426 and Airflex 465 copolymer emulsions. Airflex 426 VAE emulsion comprises a VAE/acrylic acid polymer. These measurements were made on acetone cleaned aluminum. Results are listed in Table 4.

TABLE 4

| Run | Adhesive Composition | Adhesive Strength, kg/m |
| --- | --- | --- |
| 30 | Airflex 426 control | 26.97 |
| 31 | Airflex 426 + 2% PVOH/PVAmHCl, (94/6) | 31.97 |
| 32 | Airflex 426 + 2% PVOH/PVAmHCl, (88/12) | 33.04 |
| 33 | Airflex 426 + 2% Polymin P | gelled |
| 34 | Airflex 426 + 2% PVAm | gelled |
| 35 | Airflex 465 control | 22.14 |
| 36 | Airflex 465 + 2% PVOH/PVAmHCl, (88/12) | 48.22 |
| 37 | Airflex 465 + 2% PVOH/PVAm, (88/12) | 42.32 |
| 38 | Airflex 465 + 2% PVAmHCl | 43.40 |
| 39 | Airflex 465 + 2% PVAm | gelled |
| 40 | Airflex 465 + 2% Polymin P | 38.04 |

Airflex 465 VAE: Tg = −5° C.; 66% solids
Airflex 426 VAE/AA: Tg = 0° C.; 62% solids In Airflex 465 emulsion (Runs 36 and 37), PVOH/PVAm gave much better adhesion than the control (Run 35). The PVOH/PVAm copolymers gave greatly increased adhesion to the VAE emulsion copolymers. Both the acidic and basic forms of the copolymers (Runs 36 and 37) gave values which are twice the levels of the control. The hydrochloride salt of PVAm (Run 38) also almost doubled the adhesion strength of the VAE copolymer while the basic form resulted in gelling. The control with PEI (Run 40) added also afforded a significant increase in adhesion.

In Airflex 426 emulsion (Runs 31 and 32), increasing the amine content from 6 to 12% appears to increase the adhesion slightly if at all and only modest increases in adhesion over the control (Run 30) were seen. PEI cannot be used as an adhesion promoter in Airflex 426 VAE/AA copolymer emulsion since it gels the emulsion as did the PVAm, at least at the 2% levels.

EXAMPLE 5

Polyvinyl alcohol/polyethylene/polyvinylamine terpolymers [PVOH/PE/PVAm] were tested as an additive to Airflex 400 VAE copolymer emulsion in the lamination of cloth to untreated Mylar PET film (surface energy: 55.3 dynes/cm). See Table 5 for results.

TABLE 5

| Run | Adhesive Composition | Adhesive Strength (kg per linear m) |
|---|---|---|
| 41 | Airflex 400 + 2% PVOH/PE/PVAm·HCl (83/10/7) | 6.79 |
| 42 | Airflex 400 + 2% PVOH/PE/PVAm·HCl (73/20/7) | 5.54 |
| 43 | Airflex 400 + 2% PVOH/PE/PVAm·HCl (69/19/18) | 8.04 |
| 44 | Airflex 400 + 2% PVOH/PE/PVAm (83/10/7) | 11.25 |
| 45 | Airflex 400 + 2% PVOH/PE/PVAm (73/20/7) | 8.22 |
| 46 | Airflex 400 + 2% PVOH/PE/PVAm (63/19/18) | 15.18 |

Cloth-to-Mylar PET film results reveal that PVOH/PE/PVAm·HCl terpolymer compositions had little additional effect on performance as a post add in Airflex 400 VAE emulsion compared to PVOH/PVAm·HCl in Table 1. In the case of PVOH/PE/PVAm free amine, it appears that at a constant PVOH/PVAm ratio, improvements in adhesion were observed at increasing PE content.

EXAMPLE 6

PVOH/PE/PVAm terpolymers were tested as an additive to Airflex 400 VAE copolymer emulsion in the lamination of cloth to corona treated oriented polypropylene (OPP) (surface energy=49.2 dynes/cm). See Table 6 for results.

TABLE 6

| Run | Adhesive Composition | Adhesive Strength (kg per linear m) |
|---|---|---|
| 47 | Airflex 400 + 2% PVOH/PE/PVAm·HCl (83/10/7) | 12.50 |
| 48 | Airflex 400 + 2% PVOH/PE/PVAm·HCl (73/20/7) | 15.00 |
| 49 | Airflex 400 + 2% PVOH/PE/PVAm·HCl (69/19/18) | 18.57 |
| 50 | Airflex 400 + 2% PVOH/PE/PVAm (83/10/7) | 20.54 |
| 51 | Airflex 400 + 2% PVOH/PE/PVAm (73/20/7) | 20.72 |
| 52 | Airflex 400 + 2% PVOH/PE/PVAm (63/19/18) | 28.22 |

In cloth-to-corona treated oriented polypropylene (OPP) results, the PVOH/PE/PVAm·HCl terpolymers showed improved performance as both the amine content and polyethylene content increased. Similar trends were obtained for the free amine terpolymers in cloth-to-corona OPP bonds.

STATEMENT OF INDUSTRIAL APPLICATION

The present invention provides improved adhesive compositions for use in making film laminates.

We claim:

1. In a composite structure which comprises, in intimate joined lamination, a substrate layer, an intermediate adhesive layer comprising an aqueous adhesive emulsion polymer and an adhered film, the improvement which comprises the aqueous adhesive emulsion polymer containing an adhesion promoter comprising 0.1 to 10 wt % vinylamine polymer, based on emulsion polymer, the vinylamine polymer being in the amine salt or free amine form.

2. The composite structure of claim 1 in which the vinylamine polymer has a formula selected from the group consisting of $$-(CH_2-CH)_{\overline{x}}-(CH_2-CH)_{\overline{y}}-$$
$$\phantom{-(CH_2-CH)_{\overline{x}}-}| \phantom{(CH_2-CH)_{\overline{y}}-} |$$
$$\phantom{-(CH_2-CH)_{\overline{x}}-}NH \phantom{(CH_2-CH)_{\overline{y}}-}NH_2$$
$$\phantom{-(CH_2-CH)_{\overline{x}}-}|$$
$$\phantom{-(CH_2-CH)_{\overline{x}}-}C=O$$
$$\phantom{-(CH_2-CH)_{\overline{x}}-}|$$
$$\phantom{-(CH_2-CH)_{\overline{x}}-}H$$

where
x=0–75 mole %, and
y=25–100 mole %,
and $$-(CH_2-CH)_{\overline{m}}-(CH_2-CH)_{\overline{n}}-(CH_2-CH)_{\overline{x}}-(CH_2-CH)_{\overline{y}}-$$
$$\phantom{xx}| \phantom{xxxxxx} | \phantom{xxxxxx} | \phantom{xxxxxx} |$$
$$\phantom{xx}O \phantom{xxxxxx} O \phantom{xxxxxx} NH \phantom{xxxxx} NH_2$$
$$\phantom{xx}| \phantom{xxxxxx} | \phantom{xxxxxx} |$$
$$\phantom{xx}C=O \phantom{xxxx} H \phantom{xxxxx} C=O$$
$$\phantom{xx}| \phantom{xxxxxxxxxxxxxxxxxxx} |$$
$$\phantom{xx}CH_3 \phantom{xxxxxxxxxxxxxx} H$$

where
m=0–15 mole %,
n=50–99 mole %,
x=0–30 mole %, and
y=0.5–30 mole %.

3. The composite structure of claim 1 in which the aqueous adhesive emulsion polymer is a vinyl acetate polymer, an acrylic polymer or a vinyl/acrylic polymer.

4. The composite structure of claim 1 in which the aqueous adhesive polymer is a vinyl acetate/ethylene copolymer.

5. The composite structure of claim 1 in which the substrate is a cellulosic, metallic, cloth or polymeric material.

6. The composite structure of claim 1 in which the film is metal foil, paper or polymeric material.

7. The composite structure of claim 1 in which the vinylamine polymer is the free amine form.

8. The composite structure of claim 1 in which the substrate is paper and the film is metallic or polymeric material.

9. The composite structure of claim 1 in which the substrate is cloth and the film is polymeric material.

10. The composite structure of claim 1 in which the substrate is polymeric material and the film is paper.

11. The composite structure of claim 1 in which the vinylamine polymer is a vinyl alcohol/ethylene/vinylamine terpolymer containing 5 to 30 mole % polyethylene.

12. The composite structure of claim 1 in which the vinylamine polymer has the following formula:

$$-(CH_2-CH)_{\overline{x}}-(CH_2-CH)_{\overline{y}}-$$
$$\phantom{xxxxxxxx}| \phantom{xxxxxxxx} |$$
$$\phantom{xxxxxxxx}NH \phantom{xxxxxx} NH_2$$
$$\phantom{xxxxxxxx}|$$
$$\phantom{xxxxxxxx}C=O$$
$$\phantom{xxxxxxxx}|$$
$$\phantom{xxxxxxxx}H$$

where:
x=0–75 mole %, and
y=25–100 mole %.

13. In a composite structure which comprises, in intimate joined lamination, a substrate layer, an intermediate adhesive layer comprising an aqueous adhesive emulsion polymer and an adhered polymer film, the improvement which comprises the aqueous adhesive emulsion polymer consisting essentially of an aqueous vinyl acetate/ethylene emulsion copolymer containing an adhesion promoter comprising 0.1 to 10 wt % vinylamine polymer, based on emulsion copolymer, the vinylamine polymer having a formula selected from the group consisting of

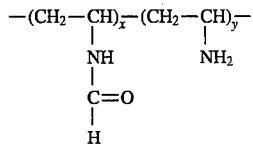

where
$x = 0$–$75$ mole %,
$y = 25$–$100$ mole %, and
$Mw = 10{,}000$ to $500{,}000$,
and

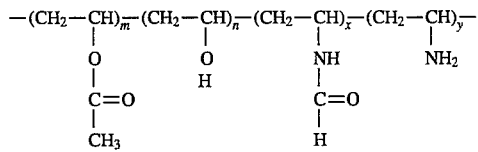

where
$m = 0$–$15$ mole %,
$n = 50$–$99$ mole %,
$x = 0$–$30$ mole %,
$y = 0.5$–$30$ mole %, and
$Mw = 10{,}000$ to $200{,}000$,
the vinylamine polymer being in the amine salt or free amine form.

14. The composite structure of claim 13 in which the vinylamine has the following formula

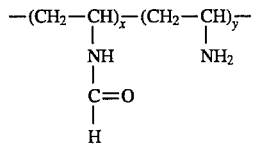

where
$x = 0$–$30$ mole %,
$y = 70$–$100$ mole %, and
$Mw = 15{,}000$ to $250{,}000$.

15. The composite structure of claim 12 in which y is $\geq 95$ mole %.

16. The composite structure of claim 13 in which the vinylamine polymer has the following formula

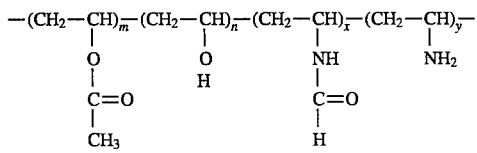

where
$m = 0$–$2$ mole %,
$n = 70$–$95$ mole %,
$x = 0.5$–$10$ mole %, and
$y = 0.5$–$20$ mole %.

17. The composite structure of claim 16 in which the acetate functionality of the copolymer is $\geq 98$ mole % hydrolyzed to hydroxy functionality and the amide functionality is $\geq 95$ mole % hydrolyzed to amine functionality.

18. In a composite structure which comprises, in intimate joined lamination, a substrate layer, an intermediate adhesive layer comprising an aqueous adhesive emulsion polymer and an adhered polymer film, the improvement which comprises the aqueous adhesive emulsion polymer consisting essentially of an aqueous vinyl acetate/ethylene emulsion copolymer containing an adhesion promoter comprising 0.5 to 5 wt % vinylamine polymer, based on emulsion copolymer, the vinylamine polymer having a formula selected from the group consisting of

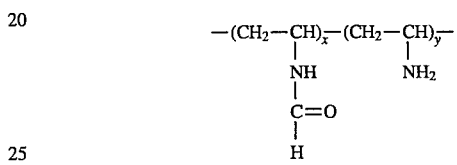

where
$x \leq 5$ mole %,
$y \geq 95$ mole %, and
$Mw = 15{,}000$ to $250{,}000$,
and

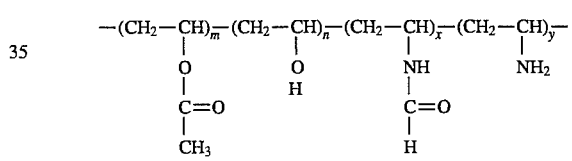

where
$m = 0$–$2$ mole %,
$n = 70$–$95$ mole %,
$x = 0.5$–$10$ mole %,
$y = 0.5$–$20$ mole %, and
$Mw = 10{,}000$ to $200{,}000$,
the vinylamine polymer being in the amine salt or free amine form.

19. The composite structure of claim 18 in which the vinylamine polymer has the following formula

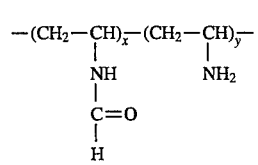

where
$x \leq 5$ mole %,
$y \geq 95$ mole %, and
$Mw = 25{,}000$ to $75{,}000$.

20. The composite structure of claim 18 in which the vinylamine polymer has the following formula

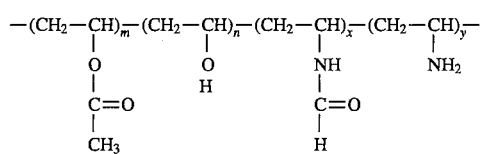
where
m=0–2 mole %,
n=70–95 mole %,
x=0.5–10 mole %,
y=0.5–20 mole %, and
Mw=30,000 to 50,000.
21. The composite structure of claim 20 in which the acetate functionality of the copolymer is ≧98 mole % hydrolyzed to hydroxy functionality and the amide functionality is ≧95 mole % hydrolyzed to amine functionality.
* * * * *